United States Patent
Tao et al.

(10) Patent No.: US 12,254,612 B1
(45) Date of Patent: Mar. 18, 2025

(54) METHOD FOR CONSTRUCTING DEFECT DETECTION MODEL, METHOD FOR DETECTING DEFECT AND RELATED APPARATUS

(71) Applicant: INSTITUTE OF AUTOMATION CHINESE ACADEMY OF SCIENCES, Beijing (CN)

(72) Inventors: Xian Tao, Beijing (CN); Shichen Qu, Beijing (CN); Zhen Qu, Beijing (CN)

(73) Assignee: INSTITUTE OF AUTOMATION CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/955,810

(22) Filed: Nov. 21, 2024

(30) Foreign Application Priority Data

Sep. 20, 2024 (CN) .......................... 202411318189.9

(51) Int. Cl.
 *G06T 7/00* (2017.01)
(52) U.S. Cl.
 CPC .. *G06T 7/0004* (2013.01); *G06T 2207/20081* (2013.01); *G06T 2207/20084* (2013.01); *G06T 2207/30108* (2013.01)
(58) Field of Classification Search
 CPC ......... G06T 7/0004; G06T 2207/20081; G06T 2207/20084; G06T 2207/30108
 See application file for complete search history.

(56) References Cited

U.S. PATENT DOCUMENTS

| 2024/0005469 A1* | 1/2024 | Jiang ..................... G06N 3/045 |
| 2025/0020598 A1* | 1/2025 | Theagarajan ...... G01N 21/9501 |

FOREIGN PATENT DOCUMENTS

| CN | 112348787 A | 2/2021 |
| CN | 113537517 A | 10/2021 |
| CN | 115147418 A | 10/2022 |

* cited by examiner

*Primary Examiner* — Ping Y Hsieh
(74) *Attorney, Agent, or Firm* — Nitin Kaushik (57) ABSTRACT

The present disclosure belongs to the field of defect detections and discloses a method for constructing a defect detection model, a method for detecting a defect and a related apparatus, obtaining an initial training image, and adding a simulated anomaly to the initial training image to obtain a simulated anomaly training image; training a preset defect recognition model according to the initial training image and the simulated anomaly training image to obtain defect position information and mask prompt information; training a preset defect segmentation model according to the defect position information and the mask prompt information; and fusing the trained defect recognition model and defect segmentation model to obtain a defect detection model; the defect recognition model includes a teacher network branch, a student network branch and an autoencoder network branch; and an output difference between the teacher network branch and the student network branch is the defect position information.

10 Claims, 5 Drawing Sheets

METHOD FOR CONSTRUCTING DEFECT DETECTION MODEL, METHOD FOR DETECTING DEFECT AND RELATED APPARATUS

CROSS-REFERENCE TO RELATED APPLICATIONS

The application claims priority to Chinese patent application No. 202411318189.9, filed on Sep. 20, 2024, the entire contents of which are incorporated herein by reference.

TECHNICAL FIELD

The present disclosure belongs to the field of defect detection and relates to a method for constructing a defect detection model, a method for detecting a defect and a related apparatus.

BACKGROUND

Defect detection plays a self-evidently important role as a core link in industrial quality control. With rapid development of intelligent manufacturing and industrial Internet, all industries have made higher requirements for accuracy, speed and intelligent level of defect detection. A defect detection for tiny and complicated components has the direct bearing on reliability and user experience of products in the fields of 3C (computer, communication and consumer electronics). In machine manufacturing, detection for high-precision parts is the key to ensure performance and service life of machines. The automobile industry faces the challenge of detection in many aspects of a vehicle body, coating, parts, etc. Defect detection for appearance and functions of household appliances is related to consumer satisfaction. In the field of aerospace, any tiny defect may cause serious security incident, so its detection standard is more strict.

Conventional manual check manners are limited by subjective judgment, fatigue effect, low efficiency and other issues, and thus demands of modern industrial production are difficult to meet. An automatic detection method based on deep learning emerges, intelligent analysis for multidimensional information of images, sound and the like is implemented by simulating a learning process of a human brain neural network, and accuracy and efficiency of defect detection are improved remarkably. However, a supervised learning method highly depends on a large quantity of labeled defect samples, manpower, material resources and time usually need to be consumed greatly for obtaining these samples, and as for some rare or new types of defects, enough samples may not be obtained fundamentally for training.

In order to overcome the limit of supervised learning, an unsupervised defect detection technology gradually becomes a research hotspot. A teacher-student network model based on knowledge distillation shows a huge potential. This type of model captures anomaly information by constructing two networks, namely, a teacher branch and a student branch, with the similar structure and different capacities or performance and using their difference in a learning process, so as to implement defect detection. The teacher branch is usually a pre-trained and high-performance model and is responsible for extracting a high-level feature of input data. The student branch is a simplified or incompletely trained model and has relatively weak learning capability. When the same data is processed by the both at the same time, the student branch cannot completely reproduce an output result of the teacher branch, so this difference may be caused by a defect in the input data. However, this method may usually have a problem of being fuzzy and incomplete in detect positioning, which affects final detection accuracy and efficiency.

SUMMARY

An objective of the present disclosure is to overcome defects in the prior art and provide a method for constructing a defect detection model, a method for detecting a defect and a related apparatus.

In order to achieve the above objective, the present disclosure is implemented by adopting the following technical solutions.

In a first aspect of the present disclosure, a method for constructing a defect detection model is provided and includes:

obtaining an initial training image, and adding a simulated anomaly to the initial training image to obtain a simulated anomaly training image;

training a preset defect recognition model according to the initial training image and the simulated anomaly training image to obtain defect position information and mask prompt information;

training a preset defect segmentation model according to the defect position information and the mask prompt information; and fusing the trained defect recognition model and defect segmentation model to obtain a defect detection model;

wherein the defect recognition model includes a teacher network branch, a student network branch and an autoencoder network branch; the teacher network branch adopts a fixed network weight, and the student network branch and the autoencoder network branch adopt a trainable network weight; and an output difference between the teacher network branch and the student network branch is the defect position information, and an output difference between the student network branch and the autoencoder network branch is the mask prompt information.

Optionally, the teacher network branch and the student network branch adopt the same network structure which is an encoder structure; and a network structure of the autoencoder network branch is an encoder-decoder structure.

Optionally, adding the simulated anomaly to the initial training image to obtain the simulated anomaly training image includes: adding the simulated anomaly to the initial training image by using an anomaly generator through the following formula to obtain the simulated anomaly training image:

$$I_a = \overline{M} \odot I + (1-\alpha)(M \odot I) + \alpha(M \odot A)$$

wherein $I_a$ is the simulated anomaly training image, I is the initial training image, M is a simulated anomaly mask, $\overline{M}$ is an inverse of M, $\odot$ is pixel-wise multiplication, $\alpha$ is an opaqueness parameter in blend, and A is an additional texture image.

Optionally, a training loss function of the teacher network branch-student network branch during training the preset defect recognition model according to the initial training image and the simulated anomaly training image is:

$$L_{ST} = L_{hard} + (CWH)^{-1} \Sigma_c \|S(P)_c\|_F^2$$

$$L_{STAE} = (CWH)^{-1} \Sigma_c \|A(I)_c - S'(I)_c\|_F^2$$

wherein $L_{ST}$ represents a loss function between the student network branch and the teacher network branch; $L_{hard}$ represents a hard sample loss function; H, W and C respectively represent a height, a width and the number of channels of an outputted feature map; $S(P)_c$ represents an output of the student network branch; c represents the number of channels; $L_{STAE}$ represents a loss function between an autoencoder network branch and the student network branch; $S'(I)_c$ represents an additional output of the student network branch; $A(I)_c$ represents an output of the autoencoder network branch; and a training loss function of the teacher network branch-autoencoder network branch is:

$$L_{AE}=(CWH)^{-1}\Sigma_c\|T(I)_c-A(I)_c\|_F^2$$

wherein $L_{AE}$ represents a loss function between the autoencoder network branch and the teacher network branch; and $T(I)_c$ represents an output of the teacher network branch.

Optionally, the defect segmentation model is obtained by introducing a trainable branch based on a pre-trained SAM model and modifying a self-attention mechanism in a Transformer module of the pre-trained SAM model; and parameters of the pre-trained SAM model are fixed during training the preset defect segmentation model according to the defect position information and the mask prompt information;

wherein a process of generating a query Q, a key K and a value V in the modified self-attention mechanism is:

$$Q=X\cdot W_{Q1}\cdot W_{Q2}+X\cdot W_Q$$

$$K=X\cdot W_K$$

$$V=X\cdot W_{V1}\cdot W_{V2}+X\cdot W_V$$

wherein X represents an input feature; $W_{Q1}$ represents a first part of an new added query matrix based on a trainable branch; $W_{Q2}$ represents a second part of the new added query matrix based on the trainable branch; $W_Q$ represents an original query matrix of the SAM model; $W_K$ represents an original key matrix of the SAM model; $W_{V1}$ represents a first part of a new added value matrix based on a trainable branch; $W_{V2}$ represents a second part of the new added value matrix based on the trainable branch; and $W_V$ represents an original value matrix of the SAM model.

In a second aspect of the present disclosure, a system for constructing a defect detection model is provided and includes:
an image processing module, configured to obtain an initial training image, and add a simulated anomaly to the initial training image to obtain a simulated anomaly training image;
a recognition model training module, configured to train a preset defect recognition model according to the initial training image and the simulated anomaly training image to obtain defect position information and mask prompt information;
a segmentation model training module, configured to train a preset defect segmentation model according to the defect position information and the mask prompt information; and
a model fusing module, configured to fuse the trained defect recognition model and defect segmentation model to obtain a defect detection model;
wherein the defect recognition model includes a teacher network branch, a student network branch and an autoencoder network branch; the teacher network branch adopts a fixed network weight, and the student network branch and the autoencoder network branch adopt a trainable network weight; and an output difference between the teacher network branch and the student network branch is the defect position information, and an output difference between the student network branch and the autoencoder network branch is the mask prompt information.

In a third aspect of the present disclosure, a method for detecting a defect is provided and includes:
obtaining an image of a to-be-detected sample; and
inputting the image of the to-be-detected sample into a preset defect detection model to obtain a defect detection result of the to-be-detected sample; wherein the preset defect detection model is constructed by using the above method for constructing the defect detection model.

In a fourth aspect of the present disclosure, a system for detecting a defect is provided and includes:
a sample image obtaining module, configured to obtain an image of a to-be-detected sample; and
a defect detection module, configured to input the image of the to-be-detected sample into a preset defect detection model to obtain a defect detection result of the to-be-detected sample;
wherein the preset defect detection model is constructed by using the above method for constructing the defect detection model.

In a fifth aspect of the present disclosure, a computer device is provided, and includes a memory, a processor and a computer program stored in the memory and capable of running on the processor, wherein the processor, when performing the computer program, implements steps of the above method for constructing the defect detection model or steps of the above method for detecting the defect.

In a sixth aspect of the present disclosure, a computer-readable storage medium is provided, storing a computer program, wherein the computer program, when performed by a processor, implements steps of the above method for constructing the defect detection model or steps of the above method for detecting the defect.

Compared with the prior art, the present disclosure has the following beneficial effects.

According to the method for constructing the defect detection model in the present disclosure, the simulated anomaly is added to the initial training image to obtain the simulated anomaly training image, then the preset defect recognition model is trained according to the initial training image and the simulated anomaly training image to obtain the defect position information and the mask prompt information, then the preset defect segmentation model is trained according to the defect position information and the mask prompt information, and finally the trained defect recognition model and defect segmentation model are fused to obtain the defect detection model. The autoencoder network branch is introduced into the defect recognition model for providing the mask prompt information, the defect position information is finely segmented finally by using the defect segmentation model, so that when a product defect detection is performed by using the defect detection model constructed through the constructing method, an omission ratio and an over-detection ratio in a product defect detection process can be reduced effectively, and the accuracy of the defect detection is improved while the detection efficiency is ensured.

DETAILED DESCRIPTION OF THE EMBODIMENTS

In order to make those skilled in the art better understand solutions of the present disclosure, the technical solutions in the embodiment of the present disclosure are described clearly and completely below with reference to the accompanying drawings in the embodiments of the present disclosure, and apparently, the described embodiments are merely some embodiments but not all embodiments of the present disclosure. All other embodiments obtained by those ordinarily skilled in the art based on the embodiments of the present disclosure without making creative efforts fall within the protection scope of the present disclosure.

It needs to be noted that terms such as "first" and "second" in the specification, claims and the above accompanying drawings of the present disclosure are used to distinguish similar objects, but are not used to describe a specific sequence or sequential order. It is to be understood that such used data is interchangeable where appropriate so that the embodiments of the present disclosure described here can be implemented in an order other than those illustrated or described here. Besides, terms "include", "have" and any of their variants are intended to cover non-exclusive inclusion, for example, a process, method, system, product or device including a series of steps or units are not necessarily limited to those steps or units listed clearly but may include other steps or units which are not listed clearly or are inherent to the process, method, product or device.

The present disclosure is further described in detail below with reference to the accompanying drawings.

With development of modern machine learning and the artificial intelligence technology, more and more related technologies are applied to industrial scenes, scratches, cracks and other defects are inevitably caused on a product surface due to system or manual factors in an industrial production process, and speed and accuracy of a conventional manual defect detection seriously limits the product production efficiency, which cannot meet detection requirements in the industrial scenes.

Though end-to-end feature extraction may be performed on a defect image currently by using defect detection methods based on a deep neural network, most of the methods cannot ensure the accuracy and high efficiency of the detection at the same time.

Figure 1:
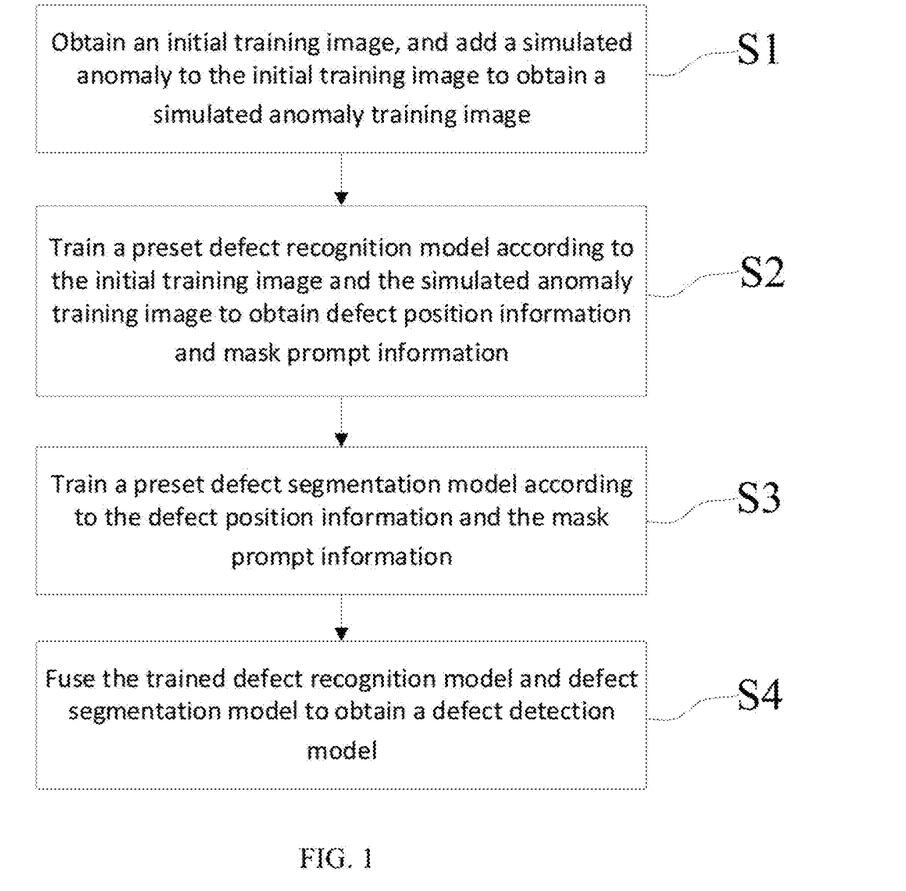
FIG. 1 is a flowchart of a method for constructing a defect detection model in an embodiment of the present disclosure.
Figure 2:
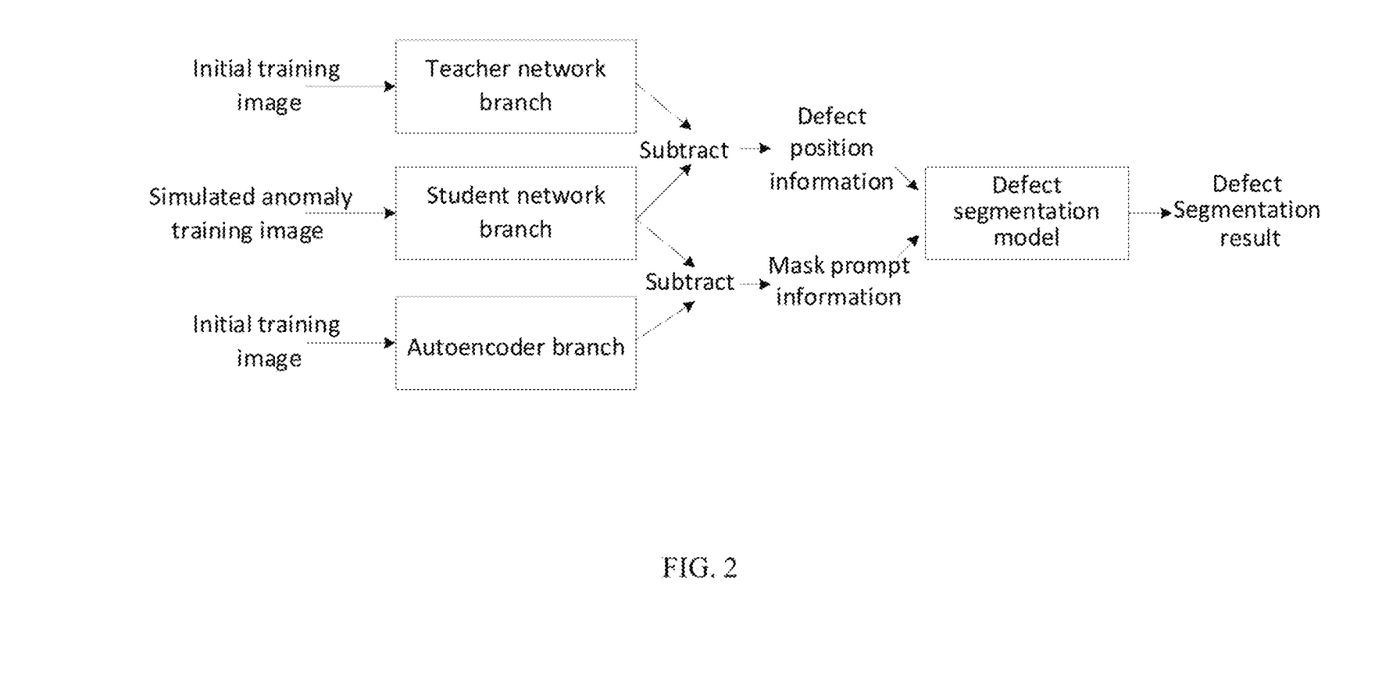
FIG. 2 is a schematic diagram of a principle of a defect detection model in an embodiment of the present disclosure.

See FIG. 1 and FIG. 2, in an embodiment of the present disclosure, a method for constructing a defect detection model is provided, and by constructing a creative defect detection model, the detection accuracy is improved while the detection efficiency is ensured. Specifically, the method for constructing the defect detection model in the present disclosure includes the following steps.

S1: an initial training image is obtained, and a simulated anomaly is added to the initial training image to obtain a simulated anomaly training image.

S2: a preset defect recognition model is trained according to the initial training image and the simulated anomaly training image to obtain defect position information and mask prompt information.

S3: a preset defect segmentation model is trained according to the defect position information and the mask prompt information.

S4: the trained defect recognition model and defect segmentation model are fused to obtain a defect detection model.

The defect recognition model includes a teacher network branch, a student network branch and an autoencoder network branch; the teacher network branch adopts a fixed network weight, and the student network branch and the autoencoder network branch adopt a trainable network weight; and an output difference between the teacher network branch and the student network branch is the defect position information, and an output difference between the student network branch and the autoencoder network branch is the mask prompt information.

According to the method for constructing the defect detection model in the present disclosure, the simulated anomaly is added to the initial training image to obtain the simulated anomaly training image, then the preset defect recognition model is trained according to the initial training image and the simulated anomaly training image to obtain the defect position information and the mask prompt information, then the preset defect segmentation model is trained according to the defect position information and the mask prompt information, and finally the trained defect recognition model and defect segmentation model are fused to obtain the defect detection model. The autoencoder network branch is introduced into the defect recognition model for providing the mask prompt information, the defect position information is finely segmented finally by using the defect segmentation model, so that when a product defect detection is performed by using the defect detection model constructed through the constructing method, an omission ratio and an over-detection ratio in a product defect detection process can be reduced effectively, and the accuracy of the defect detection is improved while the detection efficiency is ensured.

In a possible implementation, the teacher network branch and the student network branch adopt the same network structure which is an encoder structure; and a network structure of the autoencoder network branch is an encoder-decoder structure.

Specifically, a lightweight pre-training network is used as the teacher network branch, the network structure of the student network branch is consistent with that of the teacher network branch, but parameters are not pre-trained, the autoencoder network branch adopts a convolutional autoencoder structure, and it is guaranteed that output structures of the three network branches are consistent.

By introducing the autoencoder network branch, the mask prompt information is provided, and a problem of fuzzy and incomplete defect positioning existing in a conventional teacher-student network based on knowledge distillation is solved, so as to improve the detection accuracy.

In a possible implementation, adding the simulated anomaly to the initial training image to obtain the simulated anomaly training image includes: adding the simulated anomaly to the initial training image by using an anomaly generator through the following formula to obtain the simulated anomaly training image:

$$I_a = \overline{M} \odot I + (1-\alpha)(M \odot I) + \alpha(M \odot A)$$

wherein $I_a$ is the simulated anomaly training image, I is the initial training image, M is a simulated anomaly mask, $\overline{M}$ is an inverse of M, $\odot$ is pixel-wise multiplication, $\alpha$ is an opaqueness parameter in blend, and A is an additional texture image.

A manually simulated anomaly is added to the initial training image by using the simulated anomaly generator to obtain the initial training image with the added simulated anomaly, namely, the simulated anomaly training image, so as to solve a problem that a large quantity of training samples are difficult to obtain.

In a possible implementation, a training loss function of the teacher network branch-student network branch during training the preset defect recognition model according to the initial training image and the simulated anomaly training image is:

$$L_{ST} = L_{hard} + (CWH)^{-1} \Sigma_c \|S(P)_c\|_F^2$$

$$L_{STAE} = (CWH)^{-1} \Sigma_c \|A(I)_c - S'(I)_c\|_F^2$$

wherein $L_{ST}$ represents a loss function between the student network branch and the teacher network branch; $L_{hard}$ represents a hard sample loss function; H, W and C respectively represent a height, a width and the number of channels of an outputted feature map; $S(P)_c$ represents an output of the student network branch; c represents the number of channels; $L_{STAE}$ represents a loss function between an autoencoder network branch and the student network branch; $S'(I)_c$ represents an additional output of the student network branch; $A(I)_c$ represents an output of the autoencoder network branch; and a training loss function of the teacher network branch-autoencoder network branch is:

$$L_{AE} = (CWH)^{-1} \Sigma_c \|T(I)_c - A(I)_c\|_F^2$$

wherein $L_{AE}$ represents a loss function between the autoencoder network branch and the teacher network branch; and $T(I)_c$ represents an output of the teacher network branch.

Specifically, during training the preset defect recognition model according to the initial training image and the simulated anomaly training image, the simulated anomaly training image is inputted into the student network branch, the initial training image is inputted into the teacher network branch and the autoencoder network branch, during the training process, a parameter weight of the teacher network branch remains unchanged, the student network branch is trained for predicting outputs of the teacher network branch and the autoencoder network branch, the autoencoder network branch is trained for predicting the output of the teacher network branch, an output difference between the teacher network branch and the student network branch is used as the defect position information, and an output difference between the student network branch and the autoencoder network branch is used as the mask prompt information. The above defect position information and mask prompt information are inputted into an initial defect segmentation model for training, and an ideal output of all samples in the training process is a known simulated anomaly binary mask.

In a possible implementation, the defect segmentation model is obtained by introducing a trainable branch based on a pre-trained SAM model and modifying a self-attention mechanism in a Transformer module of the pre-trained SAM model; and parameters of the pre-trained SAM model are fixed during training the preset defect segmentation model according to the defect position information and the mask prompt information;

wherein a process of generating a query Q, a key K and a value V in the modified self-attention mechanism is:

$$Q = X \cdot W_{Q1} \cdot W_{Q2} + X \cdot W_Q$$

$$K = X \cdot W_K$$

$$V = X \cdot W_{V1} \cdot W_{V2} + X \cdot W_V$$

wherein X represents an input feature; $W_{Q1}$ represents a first part of an new added query matrix based on a trainable branch; $W_{Q2}$ represents a second part of the new added query matrix based on the trainable branch; $W_Q$ represents an original query matrix of the SAM model; $W_K$ represents an original key matrix of the SAM model; $W_{V1}$ represents a first part of a new added value matrix based on a trainable branch; $W_{V2}$ represents a second part of the new added value matrix based on the trainable branch; and $W_V$ represents an original value matrix of the SAM model.

Specifically, the defect segmentation model selects a large visual model SAM as the basis, while a system structure of an original SAM model is reserved, the trainable branch is introduced, and extra related parameters are provided for knowledge in the field of defect detection. By modifying the self-attention mechanism in the Transformer module of the SAM model, integration of universal knowledge and defect detection specific knowledge is implemented. In the original SAM model, the process of generating the query Q, the key K and the value V in the self-attention mechanism may be represented by using the following formula:

$$Q = X \cdot W_Q$$

$$K = X \cdot W_K$$

$$V = X \cdot W_V$$

wherein $W_Q$, $W_K$ and $W_V$ are weight matrixes which are multiplied by the input feature X to generate the corresponding query Q, key K and value V, and the input feature is mapped to a space of the query Q, the key K and the value V by using properties of matrix multiplication.

In the present implementation, the generation of the query Q, the key K and the value V in the SAM model is modified by using a low-rank self-adaptive technology. The generation of the query Q, the key K and the value V may be represented as a combination of additional linear layers $W_{Q1}$, $W_{Q2}$, $W_{V1}$ and $W_{V2}$ obtained by the original weight matrixes and the trainable branch:

$$Q = X \cdot W_{Q1} \cdot W_{Q2} + X \cdot W_Q$$

$$K = X \cdot W_K$$

$$V = X \cdot W_{V1} \cdot W_{V2} + X \cdot W_V$$

In the above formula, X represents the input feature. Outputs of $W_{Q1}$ and $W_{Q2}$ actually form a new weight matrix which represents newly learned knowledge for a defect detection task. In this case, $W_{Q1}$ and $W_{Q2}$ may be regarded as composition parts of the weight matrixes and are trained to capture a specific feature related to the defect detection. In this arrangement, the original weight matrix $W_Q$ remains general knowledge learned from the pre-trained SAM model, and $W_{Q1} \cdot W_{Q2}$ provides knowledge of a specific task for the defect detection. Finally, the trained defect recognition model and defect segmentation model are fused to obtain the complete defect detection model.

Figure 3:
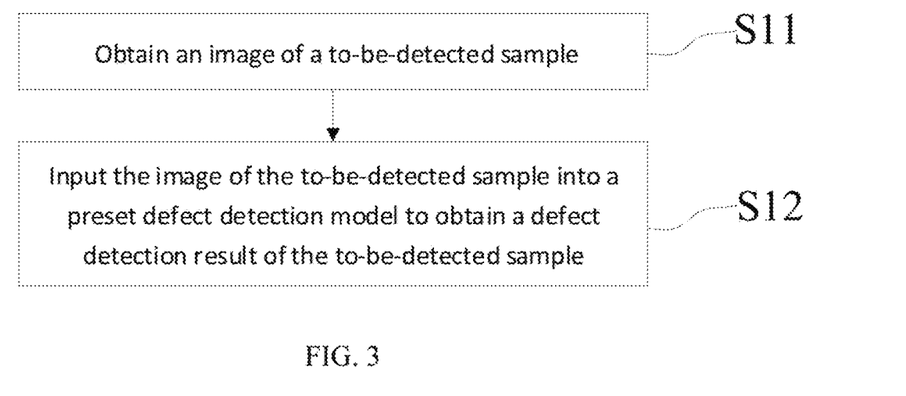
FIG. 3 is a flowchart of a method for detecting a defect in an embodiment of the present disclosure.

See FIG. 3, in yet another embodiment of the present disclosure, a method for detecting a defect is provided, including the following steps:

S11: an image of a to-be-detected sample is obtained.

S12: the image of the to-be-detected sample is inputted into a preset defect detection model to obtain a defect detection result of the to-be-detected sample; wherein the preset defect detection model is constructed by using the above method for constructing the defect detection model.

Specifically, during the defect detection, the image of the to-be-detected sample is inputted into the defect recognition model and respectively inputted into the teacher network branch, the student network branch and the autoencoder network branch, so as to obtain outputs of the teacher network branch, the student network branch and the autoencoder network branch respectively, an output difference between the teacher network branch and the student network branch is used as the defect position information, a difference between the student network branch and the autoencoder network branch is used as mask prompt information, the defect position information and the mask prompt information are inputted into the defect segmentation model, thus whether a defect exists in the image of the to-be-detected sample is judged, and a corresponding defect segmentation result is outputted, as shown in a defect mask diagram.

A design of a network structure of the defect detection model in the present disclosure has great novelty, a corresponding solution thought is provided for an actual problem of the industrial defect detection, in an actual scene, it may be applied to most of defect detections of object surfaces in the industrial field, and the application value is excellent in a case of requirement of ensuring both the accuracy and real-time property. Key points of main steps of the method for detecting the defect are that 1, a data set for training is constructed, such as a normal mobile phone screen and a fabric surface image; 2, the defect detection model of the present disclosure is fused into a specific deep learning framework, such as TensorFlow, Caffe and PyTorch; 3, the defect detection model is trained, and the defect recognition model and the defect segmentation model are trained separately according to a type of a certain object; and 4, the defect detection model is tested, a data set for testing is constructed and converted into an input image with a set size to be inputted into the defect detection model so as to obtain predicted defect position information, and in comparison with other methods, this method has very high accuracy and real-time property for different types of detected objects, which may substantially meet the requirement in the real industrial scenes.

The following description is an apparatus embodiment of the present disclosure which may be used for performing the method embodiment of the present disclosure. For details not disclosed in the apparatus embodiment, please refer to the method embodiment of the present disclosure.

Figure 4:
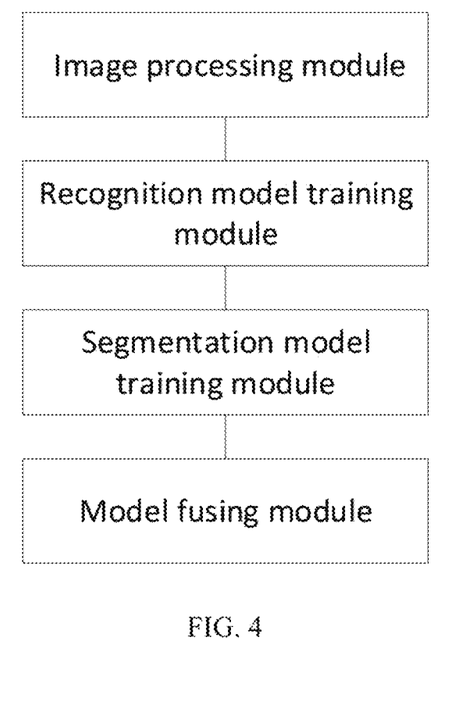
FIG. 4 is a structural block diagram of a system for constructing a defect detection model in an embodiment of the present disclosure.

See FIG. 4, in yet another embodiment of the present disclosure, a system for constructing a defect detection model is provided, which can be used for implementing the above method for constructing the defect detection model. Specifically, the system for constructing the defect detection model includes an image processing module, a recognition model training module, a segmentation model training module and a model fusing module.

The image processing module is configured to obtain an initial training image, and add a simulated anomaly to the initial training image to obtain a simulated anomaly training image; the recognition model training module is configured to train a preset defect recognition model according to the initial training image and the simulated anomaly training image to obtain defect position information and mask prompt information; the segmentation model training module is configured to train a preset defect segmentation model according to the defect position information and the mask prompt information; and the model fusing module is configured to fuse the trained defect recognition model and defect segmentation model to obtain a defect detection model; wherein the defect recognition model includes a teacher network branch, a student network branch and an autoencoder network branch; the teacher network branch adopts a fixed network weight, and the student network branch and the autoencoder network branch adopt a trainable network weight; and an output difference between the teacher network branch and the student network branch is the defect position information, and an output difference between the student network branch and the autoencoder network branch is the mask prompt information.

All related contents of all steps involved in the embodiment of the method for constructing the defect detection model may be introduced to functional descriptions of corresponding functional modules in the system for constructing the defect detection model in the embodiment of the present disclosure, which are not described here in detail.

Figure 5:
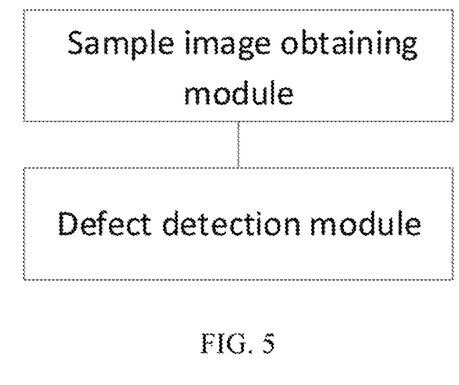
FIG. 5 is a structural block diagram of a system for detecting a defect in an embodiment of the present disclosure.

See FIG. 5, in yet another embodiment of the present disclosure, a system for detecting a defect is provided and can be used for implementing the above method for detecting the defect. Specifically, the system for detecting the defect includes a sample image obtaining module and a defect detection module. The sample image obtaining module is configured to obtain an image of a to-be-detected sample; and the defect detection module is configured to input the image of the to-be-detected sample into a preset defect detection model to obtain a defect detection result of the to-be-detected sample; wherein the preset defect detection model is constructed by using the above method for constructing the defect detection model.

All related contents of all steps involved in the embodiment of the method for detecting the defect may be introduced to functional descriptions of corresponding functional modules in the system for detecting the defect in the embodiment of the present disclosure, which are not described here in detail.

Division of the modules in the embodiment of the present disclosure is illustrative and serves merely as a logical functional division, during actual implementation, there may be another division manner, besides, all functional modules in all embodiments of the present disclosure may be integrated into one processor, or may exist physically independently, or two or more than two modules are integrated into one module. The above integrated modules may be implemented in a form of hardware or in a form of software functional modules.

In yet another embodiment of the present disclosure, a computer device is provided, including a processor and a memory, the memory is configured to store a computer program, the computer program includes a program instruction, and the processor is configured to perform the program instruction stored in a computer storage medium. The processor may be a central processing unit (CPU), or may also be another general-purpose processor, a digital signal processor (DSP), an application specific integrated circuit (ASIC), a field-programmable gatearray (FPGA) or another programmable logic device, discrete gate or transistor logic device, discrete hardware component, etc., and is a computing core and a control core of a terminal and suitable for implementing one or more instructions, specifically suitable for loading and performing one or more instructions in a computer storage medium so as to implement flows of the corresponding method or the corresponding functions; and the processor in the embodiment of the present disclosure may be configured to perform operations of the method for constructing the defect detection model and the method for detecting the defect.

In yet another embodiment of the present disclosure, the present disclosure further provides a storage medium, specifically, a computer-readable storage medium (Memory), and the computer-readable storage medium is a memory device in a computer device and is configured to store program and data. It may be understood that the computer-readable storage medium here may include a built-in storage medium in the computer device or certainly may also include an extended storage medium supported by the computer device. The computer-readable storage medium provides a storage space, and the storage space stores an operating system of a terminal. Besides, one or more instructions suitable for being loaded and performed by a processor is further stored in the storage space, and these instructions may be one or more computer programs (including a program code). It needs to be noted that the computer-readable storage medium here may be a high-speed RAM, or may also be non-volatile memory, for example, at least one disk memory. The one or more instructions stored in the computer-readable storage medium may be loaded and performed by the processor so as to implement the corresponding steps related to the method for constructing the defect detection model and the method for detecting the defect in the above embodiments.

Those skilled in the art should understand that the embodiments of the present disclosure may be provided as a method, system, or computer program product. Thus, the present disclosure may be in a form of complete hardware embodiment, complete software embodiment or software and hardware combined embodiment. Besides, the present disclosure may adopt a form of a computer program product implemented on one or more computer applicable storage media (including but not limited to a disk memory, a CD-ROM, an optical memory and the like) including a computer applicable program code.

The present disclosure is described with reference to flowcharts and/or block diagrams of the method, the device (system), and the computer program product according to the embodiments of the present disclosure. It is to be understood that each flow and/or block in the flowcharts and/or block diagrams as well as a combination of flows and/or blocks in the flowcharts and/or block diagrams may be implemented through computer program instructions. These computer program instructions may be provided for a processor of a general-purpose computer, a special-purpose computer, an embedded processor or another programmable data processing device so as to generate a machine, so that an apparatus for implementing functions specified in one or more flows in the flowcharts and/or one or more blocks in the block diagrams is generated through instructions executed by the processor of the computer or another programmable data processing device.

These computer program instructions may also be stored in a computer-readable memory capable of guiding a computer or another programmable data processing device to work in a specific mode, so that the instructions stored in the computer-readable memory generate a manufacture including an instruction apparatus, and the instruction apparatus implements the functions specified in one or more flows in the flowcharts and/or one or more blocks in the block diagrams.

These computer program instructions may also be loaded to a computer, another programmable data processing device, so that a series of operating steps may be performed on the computer or another programmable device to produce a computer-implemented processing, such that the instructions executed on the computer or the another programmable device provide steps for implementing the functions specified in one or more flows in the flowcharts and/or one or more blocks in the block diagrams.

It is to be noted finally that the above embodiments are merely for describing the technical solutions of the present disclosure but not for limiting them. Although the present disclosure have been described in detail with reference to the above embodiments, those ordinarily skilled in the art are to understand that modifications or equivalent replacements may still be made for the specific implementations of the present disclosure. Any modification or equivalent replacement without departing from the spirit and scope of the present disclosure shall fall within the protection scope of the claims of the present disclosure.

What is claimed is:

1. A method for constructing a defect detection model, comprising:
obtaining an initial training image, and adding a simulated anomaly to the initial training image to obtain a simulated anomaly training image;
training a preset defect recognition model according to the initial training image and the simulated anomaly training image to obtain defect position information and mask prompt information;
training a preset defect segmentation model according to the defect position information and the mask prompt information; and
fusing the trained defect recognition model and defect segmentation model to obtain the defect detection model;
wherein the defect recognition model comprises a teacher network branch, a student network branch and an autoencoder network branch; the teacher network branch adopts a fixed network weight, and the student network branch and the autoencoder network branch adopt a trainable network weight; and an output difference between the teacher network branch and the student network branch is the defect position information, and an output difference between the student network branch and the autoencoder network branch is the mask prompt information.

2. The method for constructing the defect detection model according to claim 1, wherein the teacher network branch and the student network branch adopt the same network structure which is of an encoder structure; and a network structure of the autoencoder network branch is an encoder-decoder structure.

3. The method for constructing the defect detection model according to claim 1, wherein adding the simulated anomaly to the initial training image to obtain the simulated anomaly training image comprises: adding the simulated anomaly to the initial training image by using an anomaly generator through the following formula to obtain the simulated anomaly training image:

$$I_a = \overline{M} \odot I + (1-\alpha)(M \odot I) + \alpha(M \odot A)$$

wherein $I_a$ is the simulated anomaly training image, I is the initial training image, M is a simulated anomaly mask, $\overline{M}$ is an inverse of M, $\odot$ is pixel-wise multiplication, $\alpha$ is an opaqueness parameter in blend, and A is an additional texture image.

4. The method for constructing the defect detection model according to claim 1, wherein a training loss function of the teacher network branch-student network branch during training the preset defect recognition model according to the initial training image and the simulated anomaly training image is:

$$L_{ST} = L_{hard} + (CWH)^{-1} \sum_c \|S(P)_c\|_F^2$$

$$L_{STAE} = (CWH)^{-1} \sum_c \|A(I)_c - S'(I)_c\|_F^2$$

wherein $L_{ST}$ represents a loss function between the student network branch and the teacher network branch; $L_{hard}$ represents a hard sample loss function; H, W and C respectively represent a height, a width and the number of channels of an outputted feature map; $S(P)_c$ represents an output of the student network branch; c represents the number of channels; $L_{STAE}$ represents a loss function between an autoencoder network branch and the student network branch; $S'(I)_c$ represents an additional output of the student network branch; $A(I)_c$ represents an output of the autoencoder network branch; and a training loss function of the teacher network branch-autoencoder network branch is:

$$L_{AE} = (CWH)^{-1} \sum_c \|T(I)_c - A(I)_c\|_F^2$$

wherein $L_{AE}$ represents a loss function between the autoencoder network branch and the teacher network branch; and $T(I)_c$ represents an output of the teacher network branch.

5. The method for constructing the defect detection model according to claim 1, wherein the defect segmentation model is obtained by introducing a trainable branch based on a pre-trained SAM model and modifying a self-attention mechanism in a Transformer module of the pre-trained SAM model; and parameters of the pre-trained SAM model are fixed during training the preset defect segmentation model according to the defect position information and the mask prompt information;

wherein a process of generating a query Q, a key K and a value V in the modified self-attention mechanism is:

$$Q = X \cdot W_{Q1} \cdot W_{Q2} + X \cdot W_Q$$

$$K = X \cdot W_K$$

$$V = X \cdot W_{V1} \cdot W_{V2} + X \cdot W_V$$

wherein X represents an input feature; $W_{Q1}$ represents a first part of an new added query matrix based on a trainable branch; $W_{Q2}$ represents a second part of the new added query matrix based on the trainable branch; $W_Q$ represents an original query matrix of the SAM model; $W_K$ represents an original key matrix of the SAM model; $W_{V1}$ represents a first part of a new added value matrix based on a trainable branch; $W_{V2}$ represents a second part of the new added value matrix based on the trainable branch; and $W_V$ represents an original value matrix of the SAM model.

6. A method for detecting a defect, comprising:
obtaining an image of a to-be-detected sample; and
inputting the image of the to-be-detected sample into a preset defect detection model to obtain a defect detection result of the to-be-detected sample; wherein the preset defect detection model is constructed by using the method for constructing the defect detection model according to claim 1.

7. A system for detecting a defect, comprising:
a sample image obtaining module, configured to obtain an image of a to-be-detected sample; and
a defect detection module, configured to input the image of the to-be-detected sample into a preset defect detection model to obtain a defect detection result of the to-be-detected sample; wherein the preset defect detection model is constructed by using the method for constructing the defect detection model according to claim 1.

8. A computer device, comprising a memory, a processor and a computer program stored in the memory and capable of running on the processor, wherein the processor, when performing the computer program, implements steps of the method for constructing the defect detection model according to claim 1.

9. A computer-readable storage medium, storing a computer program, wherein the computer program, when performed by a processor, implements steps of the method for constructing the defect detection model according to claim 1.

10. A system for constructing a defect detection model, comprising:
an image processing module, configured to obtain an initial training image, and add a simulated anomaly to the initial training image to obtain a simulated anomaly training image;
a recognition model training module, configured to train a preset defect recognition model according to the initial training image and the simulated anomaly training image to obtain defect position information and mask prompt information;
a segmentation model training module, configured to train a preset defect segmentation model according to the defect position information and the mask prompt information; and
a model fusing module, configured to fuse the trained defect recognition model and defect segmentation model to obtain a defect detection model;
wherein the defect recognition model comprises a teacher network branch, a student network branch and an autoencoder network branch; the teacher network branch adopts a fixed network weight, and the student network branch and the autoencoder network branch adopt a trainable network weight; and an output difference between the teacher network branch and the student network branch is the defect position information, and an output difference between the student network branch and the autoencoder network branch is the mask prompt information.

* * * * *